United States Patent
Yang et al.

(10) Patent No.: US 10,411,853 B2
(45) Date of Patent: Sep. 10, 2019

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/517,678

(22) PCT Filed: Oct. 12, 2015

(86) PCT No.: PCT/KR2015/010732
§ 371 (c)(1),
(2) Date: Apr. 7, 2017

(87) PCT Pub. No.: WO2016/056876
PCT Pub. Date: Apr. 14, 2016

(65) Prior Publication Data
US 2017/0310439 A1 Oct. 26, 2017

Related U.S. Application Data

(60) Provisional application No. 62/062,162, filed on Oct. 10, 2014, provisional application No. 62/075,268, (Continued)

(51) Int. Cl.
*H04L 5/00* (2006.01)
*H04W 72/04* (2009.01)
(Continued)

(52) U.S. Cl.
CPC ............ *H04L 5/0039* (2013.01); *H04L 5/001* (2013.01); *H04L 5/0032* (2013.01);
(Continued)

(58) Field of Classification Search
CPC .............. H04W 16/14; H04W 72/042; H04W 72/0453; H04W 74/004; H04W 74/0808;
(Continued)

(56) References Cited

U.S. PATENT DOCUMENTS

| 2004/0095880 A1* | 5/2004 | Laroia .................. H04W 52/34 370/208 |
| 2014/0211672 A1* | 7/2014 | Klatt ...................... H04L 5/001 370/280 |

(Continued)

FOREIGN PATENT DOCUMENTS

| KR | 1020130138826 A | 12/2013 |
| KR | 1020130140549 A | 12/2013 |

(Continued)

*Primary Examiner* — Michael Thier
*Assistant Examiner* — Prince A Mensah
(74) *Attorney, Agent, or Firm* — Dentons US LLP

(57) ABSTRACT

The present invention relates to a wireless communication system and, particularly, to a method and a device therefor, the method comprising the steps of: receiving, from a base station, resource allocation information indicating a frequency resource for a transmission of an uplink signal; and transmitting, to the base station, the uplink signal using the frequency resource indicated by the resource allocation information, wherein the frequency resource comprises multiple continuous tones when the resource allocation information relates to an Lcell, and the frequency resource comprises multiple tones separated by the same interval when the resource allocation information relates to a Ucell.

12 Claims, 10 Drawing Sheets

Related U.S. Application Data filed on Nov. 5, 2014, provisional application No. 62/082,062, filed on Nov. 19, 2014, provisional application No. 62/094,053, filed on Dec. 18, 2014, provisional application No. 62/158,558, filed on May 8, 2015, provisional application No. 62/183,196, filed on Jun. 23, 2015.

(51) Int. Cl.
*H04L 27/00* (2006.01)
*H04W 16/14* (2009.01)
*H04W 74/08* (2009.01)

(52) U.S. Cl.
CPC .......... *H04L 5/0044* (2013.01); *H04L 5/0053* (2013.01); *H04L 27/0006* (2013.01); *H04W 72/042* (2013.01); *H04W 72/0453* (2013.01); *H04L 5/0007* (2013.01); *H04W 16/14* (2013.01); *H04W 74/0808* (2013.01)

(58) Field of Classification Search
CPC ..... H04L 5/0007; H04L 5/001; H04L 5/0032; H04L 5/0039; H04L 5/0044; H04L 5/0053; H04L 27/0006
See application file for complete search history.

(56) References Cited

U.S. PATENT DOCUMENTS

| | | | | |
|---|---|---|---|---|
| 2015/0131536 A1* | 5/2015 | Kaur | ....................... | H04L 5/001 370/329 |
| 2015/0223265 A1* | 8/2015 | Fwu | ....................... | H04W 52/04 370/329 |
| 2016/0330739 A1* | 11/2016 | Webb | ....................... | H04L 5/001 |

FOREIGN PATENT DOCUMENTS

| | | |
|---|---|---|
| KR | 1020130141523 A | 12/2013 |
| KR | 1020140017517 A | 2/2014 |

\* cited by examiner

METHOD AND DEVICE FOR TRANSMITTING AND RECEIVING WIRELESS SIGNAL IN WIRELESS COMMUNICATION SYSTEM

This application is a 35 USC § 371 National Stage entry of International Application No. PCT/KR2015/010732, filed on Oct. 12, 2015, and claims priority to U.S Provisional Application Nos. 62/062,162 filed on Oct. 10, 2014, 62/075,268 filed on Nov. 5, 2014, 62/082,062 filed on Nov. 19, 2014, 62/094,053 filed on Dec. 18, 2014, 62/158,558 filed on May 8, 2015, 62/183,196 filed on Jun. 23, 2015, which are hereby incorporated by reference in their entireties for all purposes as if fully set forth herein.

TECHNICAL FIELD

The present invention relates to a wireless communication system and, more particularly, to a method for transmitting control information in a wireless communication system and an apparatus for the same.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE INVENTION

Technical Problems

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

According to an aspect of the present invention, provided herein is a method of transmitting an uplink signal by a user equipment (UE) in a wireless communication system, including aggregating a cell on a licensed band (hereinafter, LCell) and a cell on an unlicensed band (hereinafter, UCell), for communication with a base station (BS); receiving resource allocation information indicating a frequency resource from the BS, for transmission of the uplink signal; and transmitting the uplink signal to the BS using the frequency resource indicated by the resource allocation information, wherein, if the resource allocation information is about the LCell, the frequency resource includes a plurality of contiguous tones, and if the resource allocation information is about the UCell, the frequency resource includes a plurality of tones separated from each other by an equal spacing.

In another aspect of the present invention, provided herein is a user equipment (UE) for transmitting an uplink signal in a wireless communication system, including a radio frequency (RF) module; and a processor, wherein the processor is configured to aggregate a cell on a licensed band (hereinafter, LCell) and a cell on an unlicensed band (hereinafter, UCell), for communication with a base station (BS), receive resource allocation information indicating a frequency resource from the BS, for transmission of the uplink signal, and transmit the uplink signal to the BS using the frequency resource indicated by the resource allocation information, and wherein, if the resource allocation information is about the LCell, the frequency resource includes a plurality of contiguous tones, and if the resource allocation information is about the UCell, the frequency resource includes a plurality of tones separated from each other by an equal spacing.

If the resource allocation information is about the UCell, the resource allocation information may indicate a start tone index and the number of tone groups and each of the tone groups may include tones separated from each other by an equal spacing.

If the start tone index is k and the number of the tone groups is L, the frequency resource may include the L tone groups each having the start tone index of $[k+i\times(2^N/L)]$ (where $i=0, \ldots, L-1$ and $2^N$ is the total number of tone groups) and each of the tone groups may include a plurality of tones separated from each other by $2^N$ tones.

The uplink signal may be sequentially mapped in units of tone groups starting from a tone group having a low index.

A spacing between tones in a tone group is given as a maximum value from among values of $2^X$ which are less than the number of tones corresponding to $(100-Z)$ % of a system bandwidth, Z indicating a ratio of a bandwidth that a transmission signal should occupy on the UCell.

The resource allocation information may be received through a physical downlink control channel (PDCCH) on the LCell.

Advantageous Effects

According to the present invention, wireless signal transmission and reception can be efficiently performed in a wireless communication system. In addition, a carrier aggregation method for effectively securing an available resource duration and an apparatus therefor can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
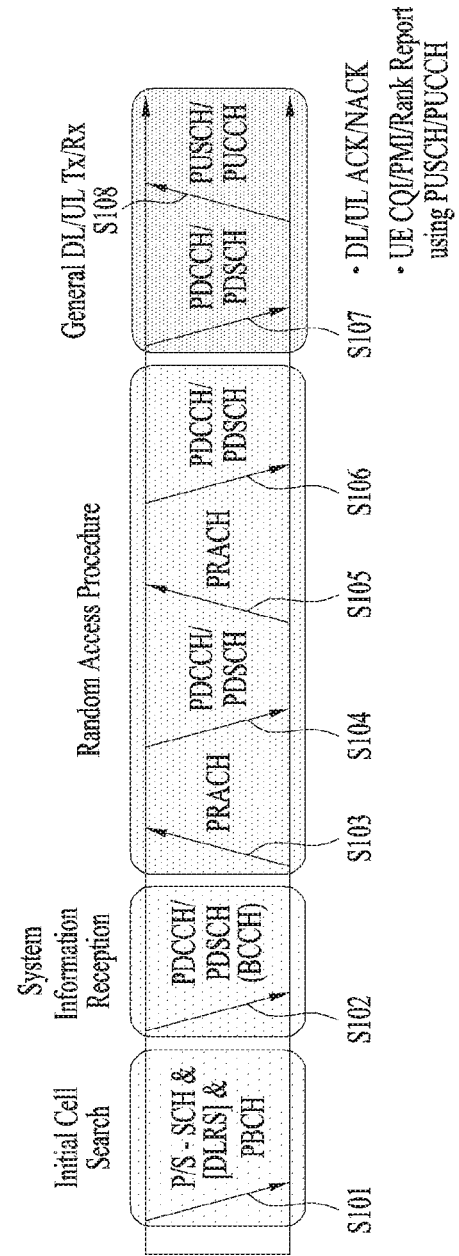
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
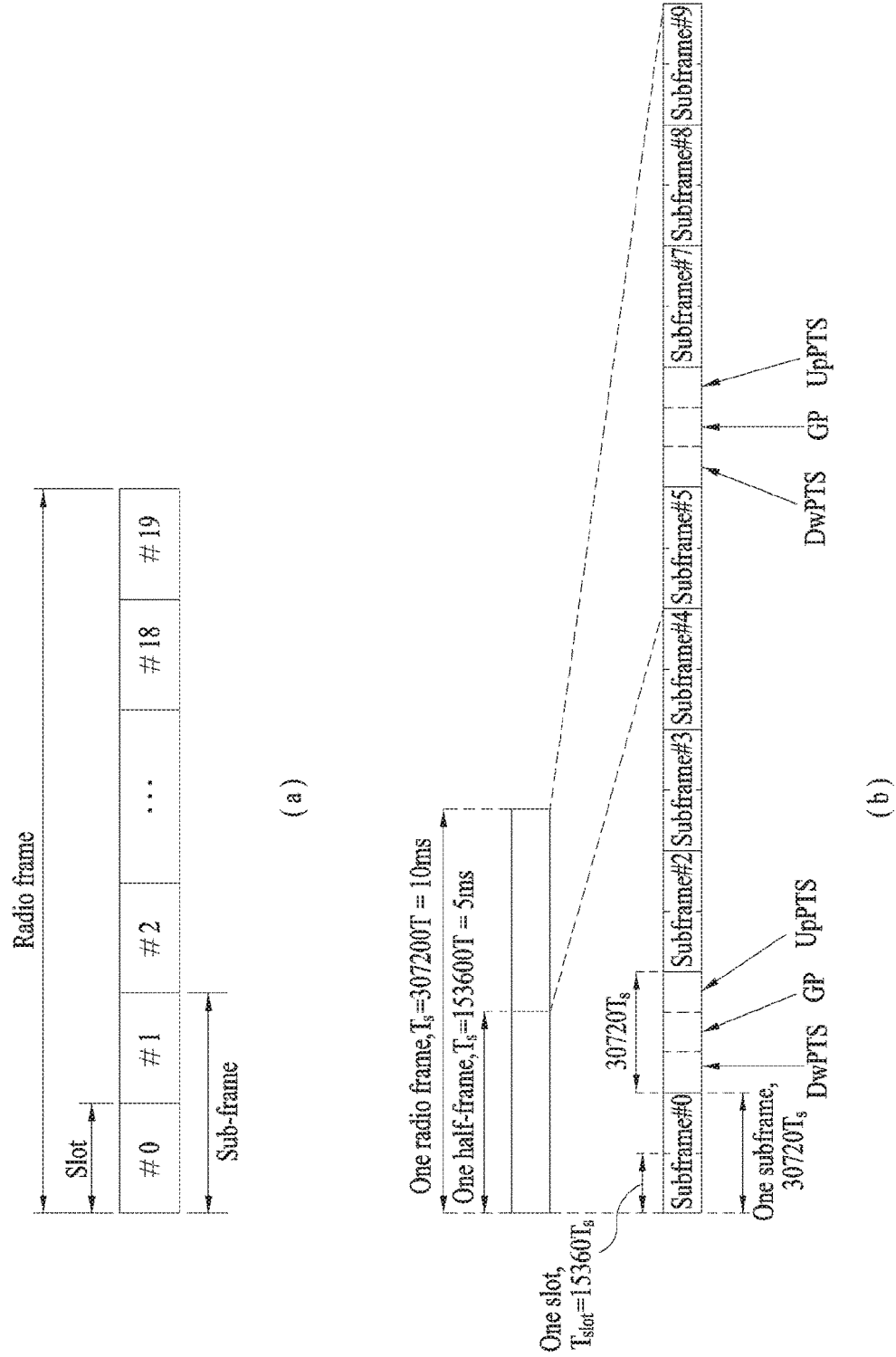
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
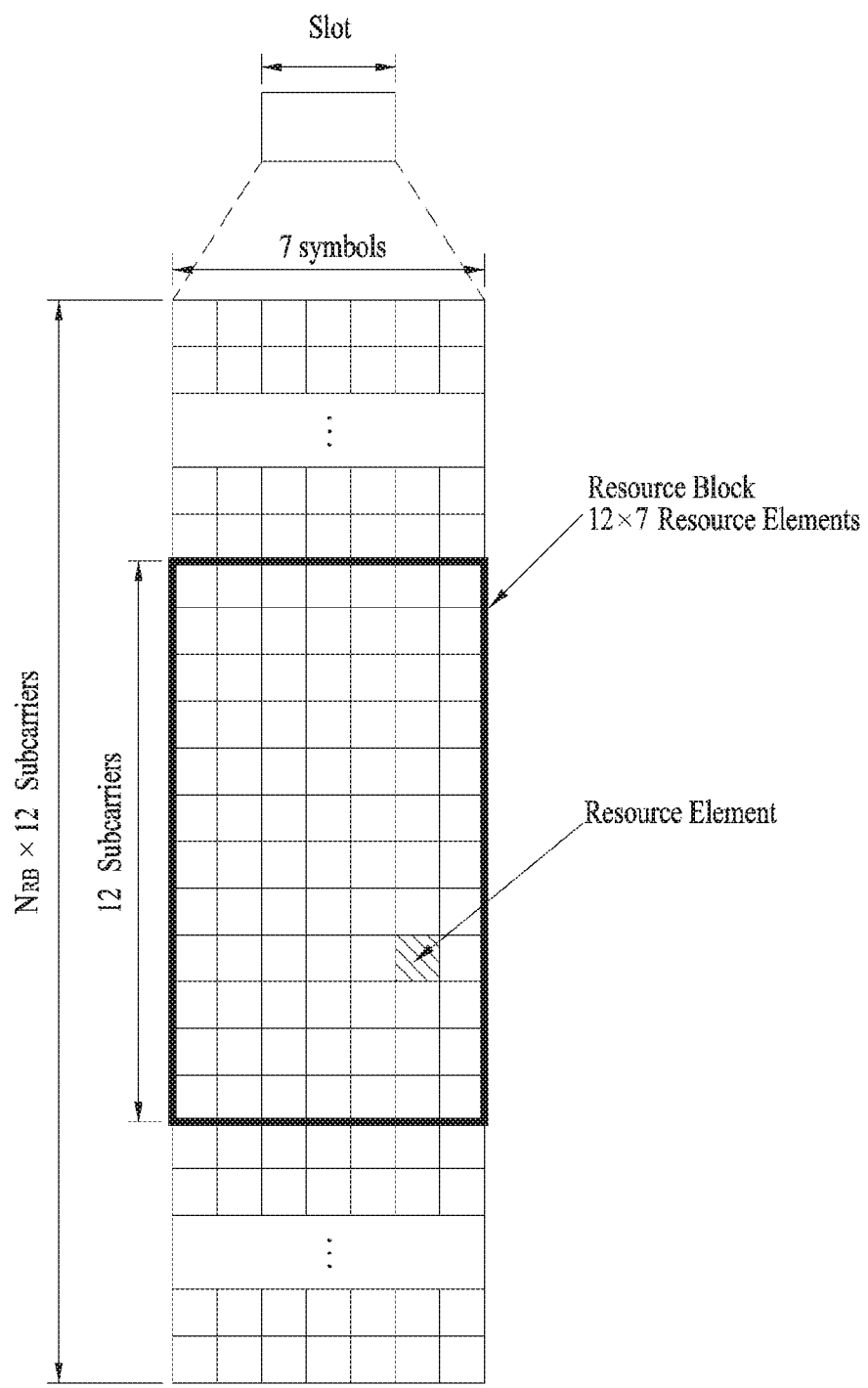
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
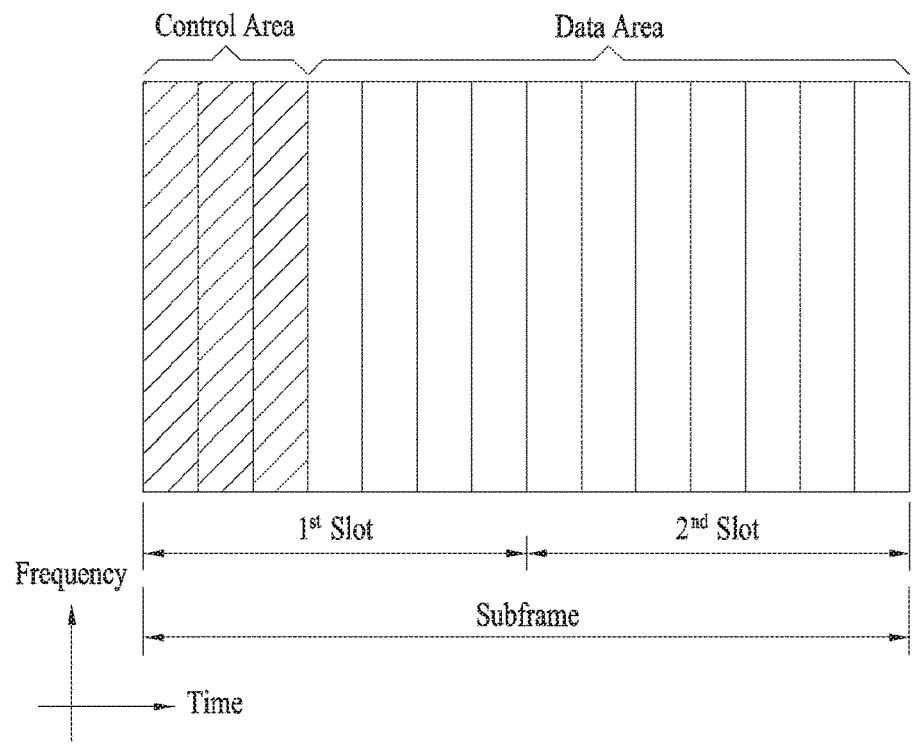
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO (Multiple Input Multiple Output)

Transmission mode 6: Closed-loop rank-1 precoding

Transmission mode 7: Single-antenna port (port 5) transmission

Transmission mode 8: Double layer transmission (ports 7 and 8) or single-antenna port (port 7 or 8) transmission Transmission mode 9: Transmission through up to 8 layers (ports 7 to 14) or single-antenna port (port 7 or 8) transmission DCI Format Format 0: Resource grants for PUSCH transmission Format 1: Resource assignments for single codeword PDSCH transmission (transmission modes 1, 2 and 7)

Format 1A: Compact signaling of resource assignments for single codeword PDSCH (all modes)

Format 1B: Compact resource assignments for PDSCH using rank-1 closed loop precoding (mod 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Figure 5:
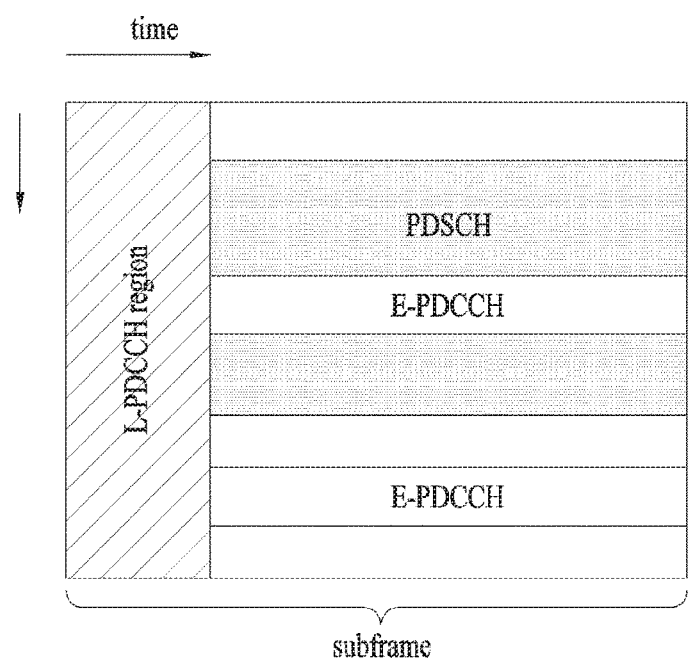
FIG. 5 illustrates an example of Enhanced Physical Downlink Control Channel (EPDCCH).

Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
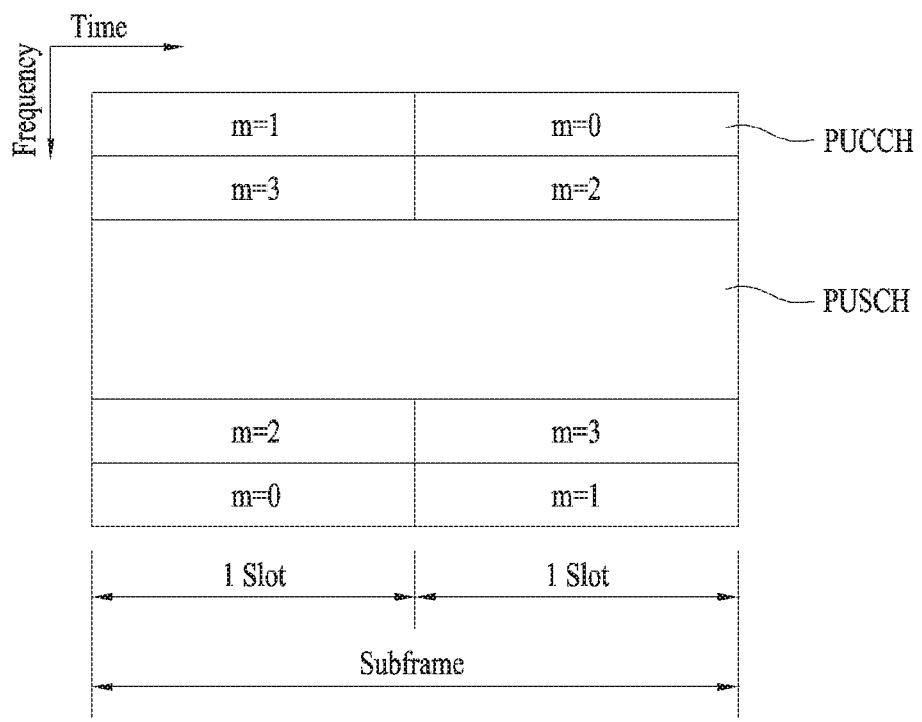
FIG. 6 illustrates the structure of an uplink subframe.

FIG. 6 illustrates an uplink subframe structure.

Referring to FIG. 6, an uplink subframe includes a plurality of (e.g. 2) slots. A slot may include different numbers of SC-FDMA symbols according to CP lengths.

For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

Figure 7:
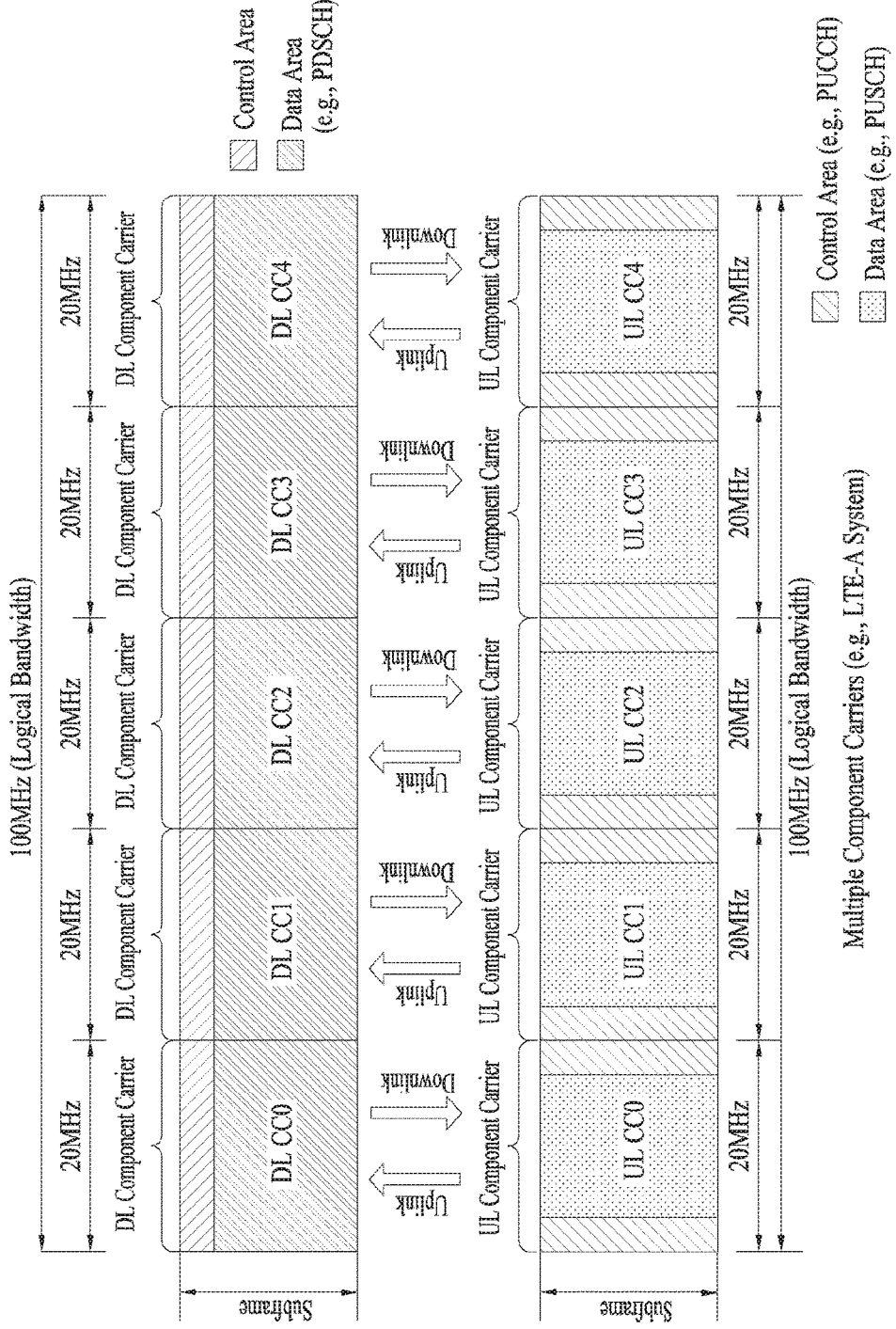
FIG. 7 illustrates a carrier aggregation (CA)-based wireless communication system.

FIG. 7 illustrates carrier aggregation (CA) communication system.

Referring to FIG. 7, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 8:
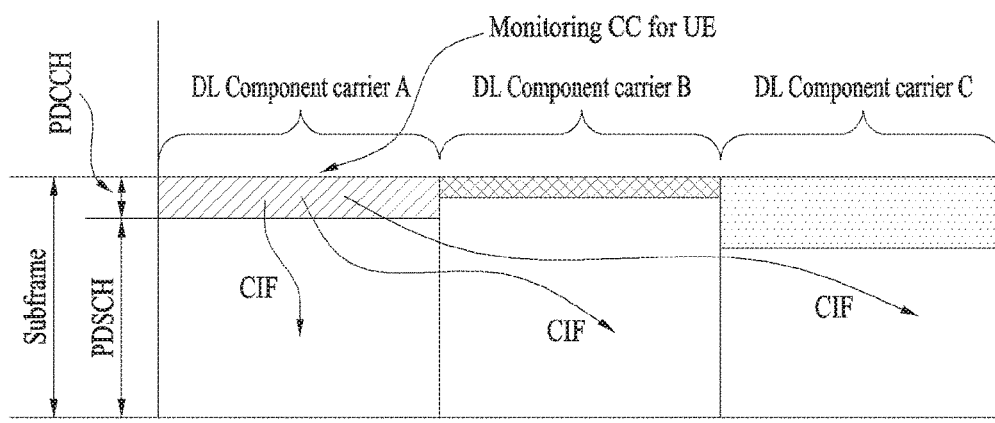
FIG. 8 illustrates a cross-carrier scheduling.

FIG. 8 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Signal Transmission and Reception in LTE-U

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 μs.

Figure 9:
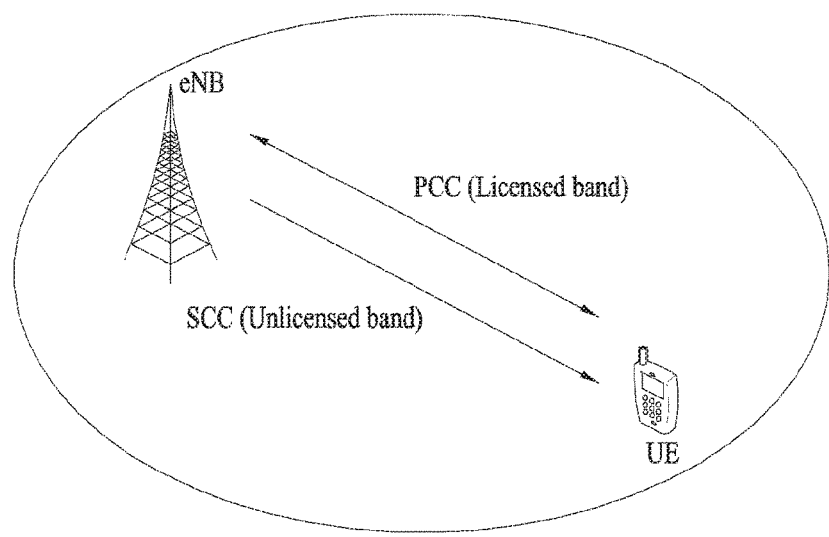
FIG. 9 illustrates carrier aggregation of a licensed band and an unlicensed band.

FIG. 9 illustrates CA of a licensed band and an unlicensed band. Referring to FIG. 9, an eNB may transmit a signal to a UE or the UE may transmit a signal to the eNB, in a CA situation of the licensed band (hereinafter, LTE-A band or L-band) and the unlicensed band (hereinafter, LTE-U band or U-band). Herein, a center carrier or frequency resource of the LTE-A band may be interpreted as a primary component carrier (PCC) or a primary cell (PCell) and a center carrier or frequency resource of the LTE-U band may be interpreted as a secondary component cell (SCC) or a secondary cell (SCell).

Figure 10:
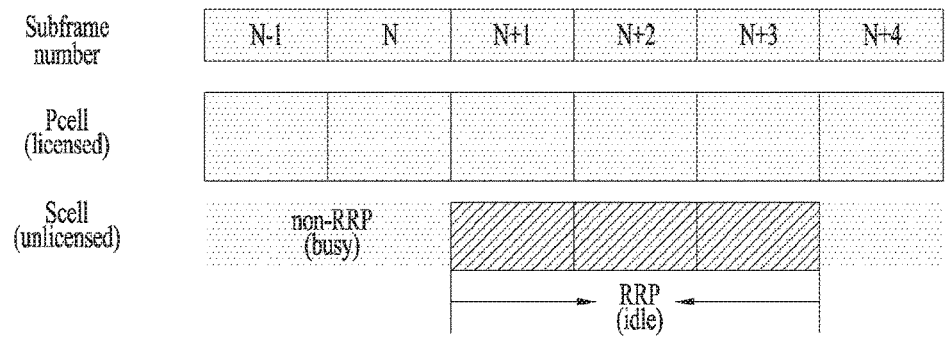
FIGS. 10 and 11 illustrate a resource reservation method on an unlicensed band.
Figure 11:
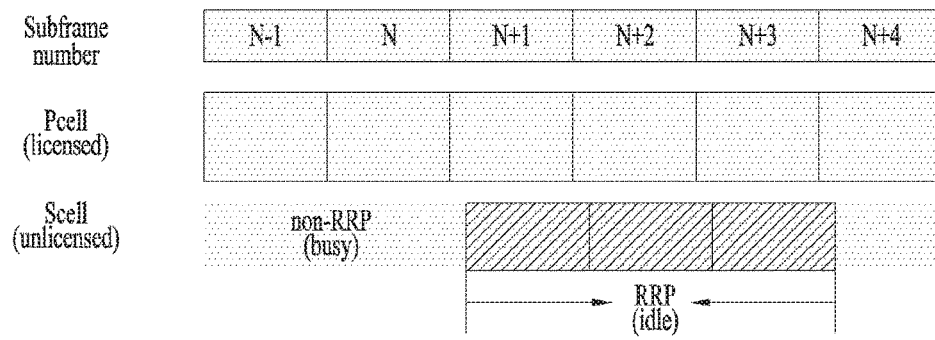

FIGS. 10 and 11 illustrate a resource reservation method on an LTE-U band. In order to perform communication on the U-band, the eNB and the UE are able to occupy/secure the U-band for a specific time duration through contention with other communication systems (e.g., Wi-Fi) irrelevant to an LTE-A system. For convenience, the time duration occupied/secured for cellular communication on the LTE-U band is referred to as a reserved resource period (RRP). To secure the RRP, various methods may be used. For example, a specific reservation signal may be transmitted in the RRP so that other communication system devices such as a Wi-Fi device may recognize that a radio channel is busy. As an example, the eNB may continuously transmit an RS and a data signal in the RRP so that a signal of a specific power level or more may be seamlessly transmitted during the RRP. If the eNB has determined the RRP during which the eNB desires to occupy the U band in advance, the eNB may pre-indicate the RRP to the UE so that the UE may maintain a communication transmission/reception link during the indicated RRP. As a scheme of indicating information about the RRP to the UE, the eNB may transmit the information about the RRP through another CC (e.g. the L band) connected in the form of CA. The RRP for UL transmission may be indicated by the eNB or may be confirmed by the UE in units of subframes by confirming a channel state through carrier sensing prior to signal transmission by the UE.

For example, the RRP including M continuous subframes (SFs) may be configured. Unlike this, one RRP may be configured as an SF set in which SFs are discontinuously present (not shown). Herein, the eNB may pre-inform the UE of the value of M and the usage of M SFs through higher layer (e.g., RRC or MAC) signaling (using a PCell) or a physical control/data channel. The start point of the RRP may be periodically set by higher layer (e.g., RRC or MAC) signaling. In addition, if it is desired that the start point of the RRP be set to SF #n, the start point of the RRP may be designated through physical layer signaling (e.g., (E)PDCCH) in SF #n or SF #(n-k) wherein k is a positive integer (e.g., 4).

The RRP may be configured such that an SF boundary or SF number/index configured on an SCell is aligned with that configured on a PCell (hereinafter, aligned-RRP) (see FIG. 10) or the SF boundary or SF number/index configured on the SCell is misaligned with that configured on the PCell (hereinafter, floating-RRP) (see FIG. 11). In the present invention, the meaning that SF boundaries between cells are aligned may indicate that an interval between SF boundaries of two different cells is less than a specific time (e.g., CP length or X μs (X≥0)). In addition, in the present invention, the PCell may mean a cell on a specific band (e.g., L-band) (e.g., LCell) which is referred to for determining the SF (and/or symbol) boundary of a UCell in terms of time (and/or frequency) synchronization.

As another operation example on the U band operating according to a contention based random access scheme, the eNB may first perform carrier sensing prior to data transmission and reception. The eNB may check whether a current channel state of the SCell is busy or idle and, upon checking that the current channel state of the SCell is idle, the eNB may transmit a scheduling grant (e.g., (E)PDCCH) through the PCell (L-band) or the SCell (U-band) and attempt to perform data transmission and reception on the SCell.

For convenience, an LTE-U based cell (e.g., SCell) is defined as the UCell and the center frequency of the UCell is defined as a (DL/UL) UCC. In addition, a cell (e.g., PCell or SCell) operating on a legacy licensed band is defined as an LCell and the center frequency of the LCell is defined as a (DL/UL) LCC. For convenience, scheduling of the UCell from the same cell and scheduling of the UCell from another cell (e.g., PCell) are referred to as self-CC scheduling and cross-CC scheduling, respectively. Further, a cell/carrier (e.g., CC) is collectively referred to as a cell. The carrier/carrier-frequency of the cell may represent an operating frequency (e.g., center frequency) of the cell, in particular, a DL operating frequency (e.g., center frequency). A (DL/UL) RRP represents a resource (duration) aperiodically secured/configured in the UCell. The RRP includes a discontinuously/aperiodically configured resource depending on a carrier sensing result.

For efficient resource use on an unlicensed band (i.e., U-band) and effective coexistence between heterogeneous systems, signal transmission on the U-band (for each region and/or band) may be subject to regulation. As an example, in relation to a power spectral density (PSD) level of a transmission signal, a transmission power per predetermined unit frequency (e.g., X [MHz]) on the U-band may be limited to a constant level (e.g., Y [dBm]) or less. As another example, in relation to a bandwidth (BW) occupation range of the transmission signal, the transmission signal on the U-band may be regulated to span a constant portion (e.g., Z [%]) or more of an entire system (nominal) BW.

In consideration of such regulations (e.g., PSD level and/or BW span related regulations), it may be necessary to configure the transmission signal on the U-band as a wideband signal form, for efficient signal transmission (Demand 1). Since DL corresponds to transmission from the eNB, there is no problem when a wideband signal is configured by a UE-common DL RS (e.g., cell-specific RS (CRS)/CSI-RS) and/or a DL control/data channel (e.g., PDCCH/PDSCH). On the other hand, since UL corresponds to transmission from the UE, a narrowband signal configuration based on a legacy contiguous resource cluster may be very inefficient or non-suitable to conform to the above regulations. Referring back to FIG. 6, a legacy PUCCH signal hops over both ends of a system band in slots as a boundary. Meanwhile, a legacy PUSCH signal is transmitted through one or two clusters. Herein, a cluster consists of one or more contiguous RB or RBGs (i.e., a contiguous resource cluster). The RBG consists of one or more contiguous RBs and the size thereof is properly determined according to a UL BW size.

In consideration of characteristics of the cluster, a UL transmission signal on the U-band may be configured in a wideband form based on a non-contiguous resource cluster. However, such a configuration may still be inefficient or improper upon considering a part maintaining a single-carrier property of the UL transmission signal (Demand 2) and a part supporting multi-UE multiplexing on UL (Demand 3). Accordingly, as a method satisfying these three requirements, i.e., 1) wideband signal, 2) single-carrier property maintenance, and 3) multi-UE multiplexing support, a configuration of the UL transmission signal based on a subcarrier (i.e., tone) group having an equal-spacing may be considered (i.e., an interleaved-FDMA (frequency division multiple access) scheme). The interleaved-FDMA scheme is the same as a legacy SC-FDMA scheme in a basic signal processing process except for a subcarrier mapping scheme. For example, in the interleaved-FDMA scheme, UL data is processed basically in order of channel coding=>modulation=>DFT conversion=>subcarrier mapping=>IFFT conversion. In the subcarrier mapping process, a complex sequence after DFT conversion may be mapped to subcarriers (i.e., tones) separated equally from each other on the frequency domain. In the present invention, subcarrier and tone have the same meaning and can be used interchangeably.

Hereinafter, a UL transmission signal configuration method based on a tone group having an equal-spacing is proposed for efficient UL transmission suitable for the U-band. Specifically, the UL transmission signal on the U-band based on a method described below may be configured in consideration of U-band regulations (particularly, BW span related regulations) and actual scheduling (particularly, tone group based resource allocation).

For convenience, it will be assumed hereinbelow that one L-band and one U-band are carrier-aggregated for the UE and wireless communication is performed through the carrier-aggregated bands. For example, a CA situation between a PCell operating a legacy L-band and an SCell operating according to an LTE-U scheme is considered. However, proposed methods of the present invention may be applied to a situation in which a plurality of L-bands and a plurality of U-bands are carrier-aggregated. In addition, the present invention may be applied even to the case in which data transmission and reception is performed between the eNB and the UE only on the U-band. The proposed methods of the present invention may be extended not only to a 3GPP LTE system but also to systems having other characteristics. Hereinbelow, the eNB will be used as an extensive term including remote radio head (RRH), base station (BS), transmission point (TP), reception point (RP), relay, etc.

(1) Tone Spacing and Tone Group Configuration Method

In this method, (in consideration of tone group based resource allocation) a tone spacing may be set to an exponent of 2 (i.e., $2^N$) (where N>0) and a plurality of tones having a tone spacing of $2^N$ may be configured as one tone group. The unit of the tone spacing may be the number of tones. Therefore, $2^N$ tone groups having a tone spacing of $2^N$ and different start tone indexes may be configured. The tone spacing of $2^N$ may be determined as a proper value so that a UL signal may span Z % or more of an entire system BW. For example, the tone spacing of $2^N$ may be determined as one value (e.g., maximum value) from among values of $2^X$ which are less than the number of tones corresponding to (100−Z) % of the system BW (where X>0).

As an example, when Z=80% (i.e., 100−Z=20%) and the system BW is 1200 tones (=100 RBs), then a maximum of values of $2^N$ less than 20% (=240 tones) of the system BW, i.e., $2^7$=128 tones may be determined as the tone spacing. Similarly, when the system BW is 600 tones (=50 RBs), then a maximum of values of $2^N$ less than 120 tones (=20% of the system BW), i.e., $2^6$=64 tones may be determined as the tone spacing. When the system BW is 300 tones (=25 RBs), then a maximum of values of $2^N$ less than 60 tones (=20% of the system BW), i.e., $2^5$=32 tones may be determined as the tone spacing.

As another method (or equivalently), the tone spacing may be determined as one value (e.g., minimum value) from among values of $2^N$ which are greater than the total number of RBs in the system BW. For example, when the number of RBs in the system BW is 100 RBs, a minimum of values of $2^N$ greater than 100, i.e., $2^7$=128 tones may be determined as the tone spacing. With respect to 50 RBs, a minimum of values of $2^N$ greater than 50, i.e., $2^6$=64 tones may be determined as the tone spacing. With respect to 25 RBs, a minimum of values of $2^N$ greater than 25, i.e., $2^5$=32 tones may be determined as the tone spacing. In this case, the number of tones per tone group may be similarly determined to the number of legacy tones per RB.

As another method, in order to maximally maintain a legacy RB unit/boundary, the tone spacing may be set to a divisor (e.g., 1, 2, 3, 4, 6, 12) of the number of tones (e.g., 12) per RB, a multiple (e.g., 12×N (where N=1, 2, . . . )) of the number of tones per RB, or $12 \times 2^N$ (where N=0, 1, . . . ). In this case, the above-described tone spacing determination method based on the Z % BW span regulation may be similarly applied.

Based on the above tone spacing determination method, the UE may acquire the UL BW of the UCell through system information and then be aware of configuration information about a tone spacing and a tone group. The tone spacing may be pre-designated on a UL BW basis or calculated using the value of Z in consideration of the afore-described relationship. The value of Z may be pre-fixed or signaled as a part of the configuration information about the UCell.

(2) Tone Group Based Resource Allocation Method

In the tone spacing and tone group configuration method according to the present invention, resource allocation (information) may be configured by indication of a start tone (group) index k (where k=0, 1, . . . , $2^N$-1) and the number L of allocated tone groups. In this case, in order to maintain an equal-spacing between tones constituting a UL signal received from the UE, the number of tone groups may be allocated as an exponent of 2 (i.e., $L=2^M$) (0≤M≤N). Then, L tone groups in which a start tone index (or tone group index) is [k+i×($2^N$/L)] (where i=0, . . . , L−1) may be finally allocated using the values k and L. In this case, the total number of bits necessary for the resource allocation method may be set to [N+log$_2$(N+1)]. Herein, N is the number of bits needed to indicate the start tone (group) index and log$_2$(N+1) is the number of bits needed to indicate the number of tone groups. The tone group index may be set to the lowest tone index constituting a tone group. DCI including the resource allocation information may be transmitted to the UE through a PDCCH and the UE may transmit a UL signal (e.g., PUSCH) on a UCell through an allocated tone group.

Figure 12:
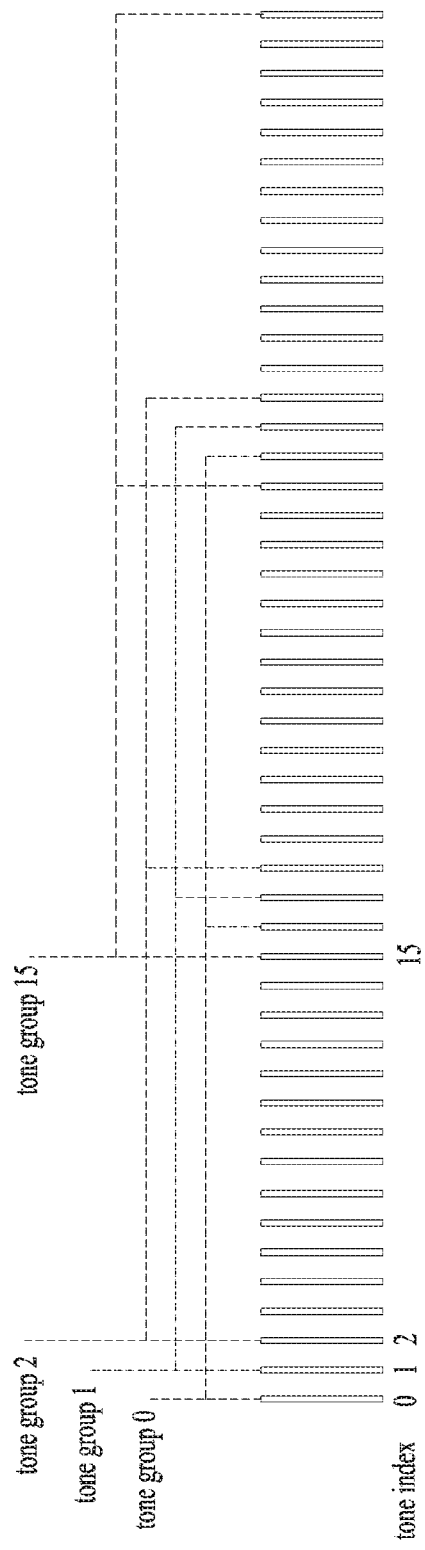
FIG. 12 illustrates resource allocation according to an embodiment of the present invention.

FIG. 12 illustrates tone group based resource allocation according to an embodiment of the present invention. It is assumed in FIG. 12 that a tone spacing is set to $2^4$=16 tones. Referring to FIG. 12, if a start tone (group) index k and the number L of tone groups L (where k=0 and L=4) are indicated to UE1, four tone groups in which the start tone index (or tone group index) is 0/4/8/12 may be allocated to UE1. Similarly, if (k=1 and L=4) is indicated to UE2, four tone groups in which the start tone index is 1/5/9/13 may be allocated to UE2. If (k=2 and L=2) is indicated to UE3, two tone groups in which the start tone index is 2/10 may be allocated to UE3. If (k=6 and L=2) is indicated to UE4, two tone groups in which the start tone index is 6/14 may be allocated to UE4. If (k=3 and L=1), (k=7 and L=1), (k=11 and L=1), and (k=15 and L=1) are indicated to UE5, UE6, UE7, and UE8, respectively, one tone group in which the start tone indexes are 3, 7, 11, and 15 may be allocated to UE5, UE6, UE7, and UE8, respectively.

Meanwhile, the tone spacing may be set to a divisor (e.g., 1, 2, 3, 4, 6, 12) of the number (e.g., 12) of tones per RB, a multiple (e.g., 12×N (where N=1, 2, . . . )) of the number of tones per RB, or $12 \times 2^N$ (N=0, 1, . . . ). Upon considering the case of tone spacing=$12 \times 2^N$, the number L of allocated tone groups may be indicated as $2^M$ (0≤M≤N), $F \times 2^N$ (F is a divisor of 12), or $F \times 2^M$ (F is a divisor of 12; 0≤M≤N). In this case, a spacing between contiguous tones constituting a UL signal from one UE may be equally set to $12 \times 2^{N-M}$ tones (when L=$2^M$), 12/F tones (when L=$F \times 2^N$), or $12/F \times 2^{N-M}$ tones (when L=$F \times 2^M$).

Meanwhile, if a plurality of tone groups is allocated to one UE, the UL transmission signal of the UE (e.g., data or control information) 1) may be sequentially mapped in units of tone groups starting from a tone group having a low (start tone) index (e.g., first tone index in first tone group=>second tone index in first tone group=> . . . =>last tone index in first tone group=>first tone index in second tone group=> . . . ), or 2) may be sequentially mapped in units of tones starting from a tone having a low index without distinguishing between tone groups (e.g., first tone index over all tone groups=>second tone index over all tone groups=> . . . ).

Since a complex symbol stream DFT-converted in the sub-carrier mapping process is mapped in order of a tone index, the locations of symbols of a modulation symbol stream constituting the UL transmission signal in the case of 1) may be switched so that tone group first mapping may be performed on the modulation symbol stream through a channel interleaver prior to DFT conversion.

In addition, on the U-band, a PUCCH corresponding to a control channel, a sounding reference signal (SRS), and a PRACH corresponding to a random access signal, as well as a PUSCH corresponding to a data channel, may be configured based on the proposed tone group. If an equal spacing (between tones) is $2^N$, that is, if the number of tone groups is $2^N$ (tone group index k=0, 1, . . . , $2^N$-1), frequency hopping for SRS transmission may be performed based on a bit reversal scheme on a tone group index basis. In the bit reversal scheme, a bit value is changed in order of most significant bit (MSB)=>least significant bit (LSB). For example, if the number of tone groups is $2^3$=8 and a tone group index for first SRS transmission is 0, SRS transmission may be performed in order of a tone group index of 000 (0)=>100 (4)=>010 (2)=>110 (6)=>001 (1)=>101 (5)=>011 (3)=>111 (7). If the total number of tone groups is $F \times 2^N$ (e.g., F=12), the tone group index (or start tone index) may be given as $F \times 2^k + j$ (k=0, 1, . . . , N-1; j=0, 1, . . . , F-1). In this case, k may be determined based on the bit reversal scheme and j may be fixed to a specific value for each UE or determined using the bit reversal scheme or a normal bit scheme.

In the present invention, each of tones constituting one tone group may be replaced with/configured as a tone set. Herein, the tone set includes a plurality of contiguous tones. If the number of tones constituting one tone set is Nt, an (equal) spacing between tone sets may be set to $Nt \times 2^N$ (or $Nt \times F$, $Nt \times 12 \times N$, or $Nt \times 12 \times 2^N$) (in this case, the total number of tone (set) groups is $2^N$ and a tone (set) group index k=0, 1, . . . , $2^N$-1). That is, the tone spacing is limited to a multiple of a tone set size. Nt may be set to an exponent of 2 (e.g., $2^N$) (or F). For example, upon considering a situation in which Nt=12 tones, i.e., Nt=1 RB, then each of 16 or 8 RBs for the system BW of 100 RBs, 8 or 4 RBs for the system BW of 50 RBs, and 4 or 2 RBs for the system BW of 25 RBs may be set as an equal spacing (between tone sets). Even when each of tones constituting a tone group is replaced with/configured as a tone set, the resource allocation method of the present invention based on indication of the start tone (group) index k and the number L of allocated tone groups may be equally applied. In addition, frequency hopping for SRS transmission may also be performed based on the bit reversal scheme on a tone group index basis, similar to the above description.

(The number of tones constituting one tone set and) a spacing between tones (tone sets) constituting one tone (set) group may be preset (e.g., per system BW). Meanwhile, if the start tone (set) index (or tone (set) group index) k and the number L of tone (set) groups allocated to the UE is directly indicated through a UL grant, for resource allocation in the present invention, the following methods may be considered.

Alt 1) If a plurality of tone (set) groups is allocated, the tone (set) groups may be allocated to uniformly maintain a spacing between tones (tone sets).

Alt 2) L contiguous tone (set) groups which are contiguous starting from the start tone (set) group index k may be allocated.

Alt 3) All tone (set) group combinations that can be allocated may be configured by indexes using the methods of Alt 1 and Alt 2 and, thereamong, an index corresponding to one tone (set) group combination may be indicated through the UL grant.

Herein, both (i) the number of tones constituting a tone set, and (ii) a spacing between tones (tone sets), 1) may be preset, or 2) may be indicated through the UL grant, 3) The spacing between tones (tone sets) may be indicated through the UL grant under the state in which the number of tones constituting a tone set is preset, or 4) the number of tones constituting a tone set may be indicated through the UL grant under the state in which the spacing between tones (tone sets) is preset.

Another method may be considered in which information about a start tone (set) index constituting a UL resource to be allocated to the UE and the spacing between tones (tone sets) (and/or the number of tones constituting one tone set) may be directly indicated through the UL grant, without additional pre-configuration of a tone (set) group (and/or the number of tones constituting one tone set). Similarly, the number of tones constituting the tone set 1) may be preset (e.g., per system BW) or 2) may be indicated through the UL grant.

Additionally, in all proposed methods, (equal spacing based) tones (tone sets) constituting one tone (set) group (the number thereof) may be determined by a union of all tones (tone sets) (the total number of tones (tone sets)) satisfying a given spacing between tones (tone sets) in an entire system BW based on an arbitrary start tone (set) index. As another method, the number N of tones (tone sets) constituting one tone (set) group 1) may be preset (e.g., per BW) or 2) may be indicated through the UL grant. In this case, N contiguous tones (tone sets) based on an equal tone (set) spacing starting from a start tone (set) index may constitute one tone (set) group.

The proposed methods of the present invention are not limited only to the case of configuring a UL transmission signal on the U-band and may be similarly applied to the case of configuring the UL transmission signal on a legacy L-band and/or a DL transmission signal on the U-band. In addition, whether to configure the UL transmission signal on the U-band (and/or L-band) according to the tone group based scheme (e.g., interleaved FDMA scheme) proposed in the present invention or according to a legacy RB (cluster) based scheme (e.g., SC-FDMA scheme) may be configured for the UE. In the former case, information about a spacing between tones (tone sets) in one tone group may be directly signaled to the UE. If the UL transmission signals on the U-band and the L-band are configured based on different schemes, the UE may differently interpret resource allocation information in the UL grant according to whether the UL grant serves to schedule an LCell or an UCell. For example, the UL transmission signal of the U-band (i.e., UCell) may be configured according to a tone group based scheme and the UL transmission signal of the L-band (i.e., LCell) may be configured according to the legacy RB (cluster) based scheme. In this case, the UE receives the UL grant and, if the UL grant concerns the LCell, the UE may configure/transmit a UL signal (e.g., PUSCH) under the assumption that resource allocation information in the UL grant indicates contiguous resource cluster based resource allocation. Meanwhile, if the UL grant concerns the UCell, the UE may configure/transmit the UL signal (e.g., PUSCH) under the assumption that resource allocation information in the UL grant indicates tone group based resource allocation.

(3) Tone Group Based UL Scheduling/Transmission Improvement Method

In the present invention, the size of a tone (set) group (e.g., amount of UL resources), which is a basic resource allocation unit, may be greater than an RB, which is a basic resource allocation unit in a legacy LTE system. For this reason, a transport block size (TBS) that can be selected for PUSCH scheduling may be limited. To solve this problem, when the tone group based resource allocation scheme is applied, under the assumption/definition that a tone (set) is regarded as an RB and a tone (set) group is regarded as an RBG, a method of extending a TBS selection range for PUSCH scheduling may be considered so that a TBS corresponding to a value other than the number N of RBs allocated through the UL grant may be selected/indicated in addition to a TBS corresponding to N.

Hereinbelow, unless distinguished otherwise, the tone set and RB are used interchangeably and distinguished according to context and the tone set group and the RBG are used interchangeably and distinguished according to context.

Table 4 shows the relationship between a legacy TBS and the number of RBs. In Table 4, the number of RBs is 1 to 10 and the TBS is defined up to 110 RBs. The TBS is a bit value. $I_{TBS}$ denotes an index of an MCS and is shown in Table 5.

TABLE 4

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 5

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

TABLE 5-continued

| MCS Index $I_{MCS}$ | Modulation Order $Q_m$ | TBS Index $I_{TBS}$ |
|---|---|---|
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

As an example, if K RBGs are allocated through the UL grant, a TBS corresponding to the number of one or more RBs between (K−1) RBGs and K RBGs (and/or the number of one or more RBs between K RBGs and (K+1) RBGs) may be selected/indicated in addition to a TBS corresponding to the number of RBs corresponding to K RBGs.

In addition, the number of bits constituting an MCS field may increase according to the number of RBs added to extend a TBS range (e.g., if the number of added RBs is one, one bit may be added to a legacy MCS field and, if the number of added RBs is 2 or 3, two bits may be added to the legacy MCS field). In this case, a PUSCH may be transmitted using K RBGs allocated originally from the UL grant, regardless of whether the indicated TBS corresponds to the number of RBs corresponding to the K RBGs or the number of other (added) RBs.

Meanwhile, in a legacy LTE system, one condition for scheduling a PUSCH carrying only an aperiodic CSI report without a UL-SCH (hereinafter, "a-CSI only condition") is the case in which the number N of the RBs allocated through the UL grant is less than a specific value M. Herein, M may have a value which increases according to a target DL cell for CSI reporting or the number L of CSI processes (e.g., M is a multiple of 4 and M is set to 4 when L=1 and to 20 when L>1). If the legacy condition based on an RB unit is applied to the above RBG (i.e., tone group) based UL scheduling method, PUSCH resource allocation that can satisfy the condition may be limited. In consideration of this problem, when the RBG based proposed method is applied, the a-CSI only condition may be configured based on an RBG unit.

For example, it is assumed that the a-CSI only condition is set to N≤M when the legacy RB based UL scheduling scheme is applied to the L value. In this case, in the RBG (i.e., tone group) based UL scheduling method of the present invention, the a-CSI only condition may be set to N≤K×R (where K is an integer) under the assumption that one RBG (i.e., tone group) includes R RBs (i.e., tones (tone sets)). Herein, (K×R) may be determined as a minimum value equal to M or larger than M. R corresponding to the size of the RBG (i.e., tone group) may differ according to system BW and thus K or (K×R) may vary with the system BW.

Additionally, a method of hopping a tone group for PUSCH transmission over slots may be considered to obtain frequency diversity in tone (set) group based UL scheduling/transmission of the present invention. As an example, under the assumption that the total number of tone groups is N, N tone groups having indexes from 0 to N−1 may be considered. In this case, if a tone group index indicated through the UL grant is K (0≤K≤N−1), a tone group corresponding to index K and a tone group corresponding to index {(K+N/2) modulo N} may be allocated/used for PUSCH transmission in the first slot and the second slot of a subframe, respectively. Herein, (A modulo B) denotes a remainder obtained by dividing A by B and N/2 may be replaced with a maximum integer less than N/2 or a minimum integer greater than N/2 (when N/2 is not an integer).

Additionally, in order to randomize an influence of interference between contiguous cells and/or different operators, at least one of a base sequence (BS), a cyclic shift (CS), and an orthogonal cover code (OCC), used for a DMRS, may be changed in one or multiple tone (set) units in each tone (set) group or, while the same DMRS BS, CS, and OCC are maintained in each tone (set) group, at least one of the DMRS BS, CS, and OCC may be changed in one or multiple tone (set) group units.

Meanwhile, in the legacy LTE system, HARQ-ACK for PUSCH transmission is transmitted through a PHICH resource linked to the lowest RB index allocated to a corresponding PUSCH. If this scheme is applied to the proposed UL scheduling/transmission method based on a tone (set) group, only a PHICH resource linked to a low RB index may be allocated. Then, a problem of PHICH collision between PUSCHs (from different UEs) may arise. Therefore, a specific offset may be applied to the lowest RB index (i.e., start tone (set) index) used to determine a PHICH index (e.g., final PHICH index=PHICH index linked to (lowest RB index+offset)) or the specific offset may be applied to a PHICH index linked to the lowest RB index (i.e., start tone (set) index) (e.g., final PHICH index=PHICH index linked to the lowest RB index+offset). Herein, the offset may be given as a function of a start tone (set) or a tone (set) group index.

PUSCH Transmission Scheme on U-Band Accompanying SRS Transmission

When a tone group based IFDMA transmission scheme is considered to comply with the Z % BW span regulation on the U-band, the RB (cluster) based PUSCH resource allocation scheme which has been applied to the legacy LTE system and the SC-FDMA signal configuration method based on this scheme cannot be maintained. In consideration of this shortcoming, a PUSCH transmission scheme in the form of accompanying SRS transmission is proposed so that the legacy RB (cluster) based resource allocation and SC-FDMA signal configuration may be maintained even on the U-band.

Alt 1) Short (rate-matched) PUSCH+one wideband SRS in one subframe

A PUSCH and one wideband SRS are transmitted through (different SC-FDMA symbols in) one subframe and the PUSCH may be configured in the form of a short PUSCH obtained by applying rate-matching (or puncturing) to one SC-FDMA symbol on which an SRS is transmitted. Herein, the wideband SRS may be set/configured in the form of spanning Z % or more of (the total number of RBs in) an entire system BW in consideration of the Z % BW span regulation. For example, in a situation of Z=80, each of 96 or 80 RBs for the system BW of 100 RBs, 48 or 40 RBs for the system BW of 50 RBs, and 24 or 20 RBs for the system BW of 25 RBs may be configured as transmission BW of the wide band SRS.

Alt 2) Short (rate-matched) PUSCH+two SRSs with hopping in one subframe

A PUSCH and two SRSs may be transmitted through (different SC-FDMA symbols in) one subframe and the PUSCH may be configured in the form of a short PUSCH obtained by applying rate-matching (or puncturing) to two SC-FDMA symbols on which the SRSs are transmitted. In this case, the first SRS of the two SRSs may be transmitted through 1) the first SC-FDMA symbol in the subframe, 2) the last SC-FDMA symbol in the first slot, or 3) the second to last SC-FDMA symbol in the subframe. The second SRS may be transmitted through the last SC-FDMA symbol in the subframe (in a similar manner to a legacy scheme). In this case, in consideration of the Z % BW span regulation, hopping BW between first SRS transmission and second SRS transmission, i.e., BW that an entire transmission band of the two SRSs span (e.g., a distance between minimum/maximum RBs (RB indexes) in which the SRSs are transmitted) may be configured/set in the form of spanning Z % or more of (the total number of RBs in) an entire system BW. Upon considering a situation of Z=80, the hopping BW between SRS transmissions may be set to a value similar to a wideband SRS transmission BW per system BW described in Alt 1 on a system BW basis.

Herein, the case in which a PUSCH is configured/transmitted in the form of applying rate-matching (or puncturing) to SRS transmission symbols may be limited to the case in which transmission bands of the PUSCH and the SRSs overlap. That is, if the transmission bands of the PUSCH and the SRSs overlap, the PUSCH may be configured/transmitted in the form of applying rate-matching (or puncturing) to the SRS transmission symbols and, if not (i.e., the transmission bands of the PUSCH and the SRSs do not overlap), the PUSCH may be configured/transmitted in the form of not applying rate-matching (or puncturing) to the SRS transmission symbols. In addition, in the scheme of Alt 2, the two SRSs (having different transmission bands) may be simultaneously transmitted through one specific SC-FDMA symbol (e.g., the last SC-FDMA symbol in a subframe).

Meanwhile, as an exceptional case of Alt 1/2, a PUSCH transmitted through either one edge of a system BW may accompany only one SRS transmission at the other edge so that BW that an entire transmission band of the PUSCH and the SRS spans (e.g., a distance between minimum/maximum RBs (RB indexes) in which the PUSCH or the SRS is transmitted) may comply with the Z % BW span regulation. In this case, the transmission BW of the SRS may be set to a value less than that of a wideband SRS. In addition, exceptionally, when even PUSCH transmission BW or (hopping) BW that a PUSCH transmission band spans (hops) complies with the Z % BW span regulation, PUSCH transmission may be configured not to accompany SRS transmission. Therefore, the PUSCH may be configured/transmitted in the form of a normal PUSCH without rate-matching (or puncturing).

Additionally, the above proposed method in the form of accompanying SRS transmission may be similarly applied to PRACH transmission and PUCCH transmission on the U-band as well as PUSCH transmission on the U-band.

Figure 13:
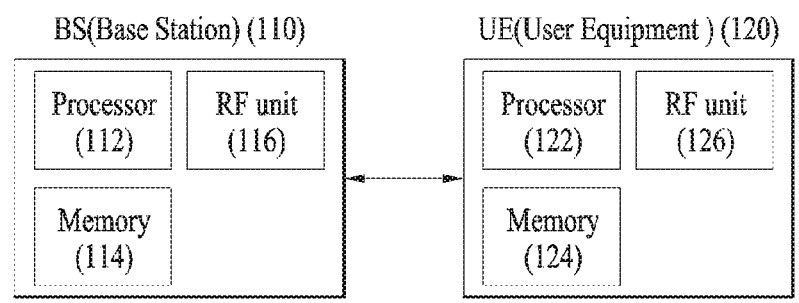
FIG. 13 illustrates a base station and a user equipment applicable to an embodiment of the present invention.

FIG. 13 illustrates a BS and a UE of a wireless communication system, which are applicable to embodiments of the present invention.

Referring to FIG. 13, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to a user equipment, a base station, or other devices of wireless mobile communication systems.

The invention claimed is:

1. A method of transmitting an uplink signal by a user equipment (UE) in a wireless communication system, the method comprising:
   aggregating a cell on a licensed band (LCell) and a cell on an unlicensed band (UCell), for communication with a base station (BS);
   receiving resource allocation information indicating a frequency resource from the BS, for transmission of the uplink signal; and
   transmitting the uplink signal via one of the LCell and the UCell to the BS using the frequency resource indicated by the resource allocation information,
   wherein, if the resource allocation information is about the LCell, the frequency resource indicated by the resource allocation information includes a plurality of contiguous tones within the LCell, and
   wherein if the resource allocation information is about the UCell, the frequency resource indicated by the resource allocation information includes a plurality of tones separated from each other by an equal spacing within the UCell.

2. The method according to claim 1,
wherein, if the resource allocation information is about the UCell, the resource allocation information indicates a start tone index and the number of tone groups and each of the tone groups includes tones separated from each other by an equal spacing.

3. The method according to claim 2,
wherein, if the start tone index is k and the number of the tone groups is L, the frequency resource includes the L tone groups each having the start tone index of $[k+i\times(2^N/L)]$ (where i=0, ..., L−1 and $2^N$ is the total number of tone groups) and each of the tone groups includes a plurality of tones separated from each other by $2^N$ tones.

4. The method according to claim 2,
wherein the uplink signal is sequentially mapped in units of tone groups starting from a tone group having a low index.

5. The method according to claim 2,
wherein a spacing between tones in a tone group is given as a maximum value from among values of $2^X$ which are less than the number of tones corresponding to (100−Z) % of a system bandwidth, Z indicating a ratio of a bandwidth that a transmission signal should occupy on the UCell.

6. The method according to claim 1,
wherein the resource allocation information is received through a physical downlink control channel (PDCCH) on the LCell.

7. A user equipment (UE) for transmitting an uplink signal in a wireless communication system, the UE comprising:
a radio frequency (RF) module; and
a processor,
wherein the processor is configured to:
aggregate a cell on a licensed band (LCell) and a cell on an unlicensed band (UCell), for communication with a base station (BS),
receive resource allocation information indicating a frequency resource from the BS, for transmission of the uplink signal, and
transmit the uplink signal via one of the LCell and the UCell to the BS using the frequency resource indicated by the resource allocation information,
wherein, if the resource allocation information is about the LCell, the frequency resource indicated by the resource allocation information includes a plurality of contiguous tones within the LCell, and
wherein if the resource allocation information is about the UCell, the frequency resource indicated by the resource allocation information includes a plurality of tones separated from each other by an equal spacing within the UCell.

8. The UE according to claim 7,
wherein, if the resource allocation information is about the UCell, the resource allocation information indicates a start tone index and the number of tone groups and each of the tone groups includes tones separated from each other by an equal spacing.

9. The UE according to claim 8,
wherein, if the start tone index is k and the number of the tone groups is L, the frequency resource includes the L tone groups each having the start tone index of $[k+i\times(2^N/L)]$ (where i=0, ..., L−1 and $2^N$ is the total number of tone groups) and each of the tone groups includes a plurality of tones separated from each other by $2^N$ tones.

10. The UE according to claim 8,
wherein the uplink signal is sequentially mapped in units of tone groups starting from a tone group having a low index.

11. The UE according to claim 8,
wherein a spacing between tones in a tone group is given as a maximum value from among values of $2^X$ which are less than the number of tones corresponding to (100−Z) % of a system bandwidth, Z indicating a ratio of a bandwidth that a transmission signal should occupy on the UCell.

12. The UE according to claim 7,
wherein the resource allocation information is received through a physical downlink control channel (PDCCH) on the LCell.

* * * * *